(12) United States Patent
Jiang et al.

(10) Patent No.: US 11,343,023 B2
(45) Date of Patent: May 24, 2022

(54) METHOD AND DEVICE IN NODE FOR WIRELESS COMMUNICATION

(71) Applicants: Qi Jiang, Shanghai (CN); XiaoBo Zhang, Shanghai (CN); Lin Yang, Shanghai (CN)

(72) Inventors: Qi Jiang, Shanghai (CN); XiaoBo Zhang, Shanghai (CN); Lin Yang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 263 days.

(21) Appl. No.: 16/835,326

(22) Filed: Mar. 31, 2020

(65) Prior Publication Data

US 2020/0228255 A1    Jul. 16, 2020

Related U.S. Application Data

(63) Continuation of application No. PCT/CN2019/098838, filed on Aug. 1, 2019.

(30) Foreign Application Priority Data

Aug. 8, 2018 (CN) .......................... 201810894930.4

(51) Int. Cl.
*H04W 72/12* (2009.01)
*H04L 1/18* (2006.01)
(Continued)

(52) U.S. Cl.
CPC .......... *H04L 1/1819* (2013.01); *H04L 5/0055* (2013.01); *H04W 72/1257* (2013.01); *H04W 92/18* (2013.01)

(58) Field of Classification Search
CPC .............. H04W 72/1257; H04W 92/18; H04L 1/1819; H04L 5/0055
See application file for complete search history.

(56) References Cited

U.S. PATENT DOCUMENTS

2017/0127251 A1    5/2017 Yi et al.
2020/0288444 A1*   9/2020 Cai .................. H04W 72/1278
(Continued)

FOREIGN PATENT DOCUMENTS

CN    105101429 A    11/2015
CN    105981315 A     9/2016
(Continued)

OTHER PUBLICATIONS

CN First Office Action received in application No. 201810894930.4 dated Oct. 30, 2020.
(Continued)

*Primary Examiner* — Brian P Cox

(57) ABSTRACT

The disclosure provides a method and a device in a node for wireless communication. A first node transmits a target radio signal, and transmits a first signaling and a first radio signal; the target radio signal includes Q index group(s), the Q index group(s) comprises(comprise) Q first-type index(es) respectively, and each of the Q index group(s) includes at least one second-type index associated with a corresponding first-type index; the first signaling schedules the first radio signal, the first signaling includes one second-type index, a first-type index included in a first index group is used for generating the first radio signal, and the first index group is one of the Q index group(s) that includes a same second-type index as the first signaling. By designing the Q index group(s) and the first index group.

20 Claims, 15 Drawing Sheets

(51) Int. Cl.
*H04L 5/00* (2006.01)
*H04W 92/18* (2009.01)

(56) References Cited

U.S. PATENT DOCUMENTS

| | | | |
|---|---|---|---|
| 2021/0160844 A1* | 5/2021 | Lin | H04L 1/0072 |
| 2021/0204250 A1* | 7/2021 | Ashraf | H04W 76/14 |

FOREIGN PATENT DOCUMENTS

| | | |
|---|---|---|
| CN | 106165510 A | 11/2016 |
| CN | 106792428 A | 5/2017 |
| CN | 106792429 A | 5/2017 |
| CN | 107113538 A | 8/2017 |
| CN | 107211338 A | 9/2017 |
| CN | 107547177 A | 1/2018 |
| CN | 107852777 A | 3/2018 |
| CN | 108141729 A | 6/2018 |
| CN | 108322414 A | 7/2018 |
| WO | 2016154857 A1 | 10/2016 |
| WO | 2017075798 A1 | 5/2017 |
| WO | 2017126266 A1 | 7/2017 |

OTHER PUBLICATIONS

First Search Report received from the Chinese patent No. 201810894930.4 dated Oct. 25, 2020.

ISR received in application No. PCT/CN2019/098838 dated Oct. 24, 2019.

LG Electronics, "Discussion on sidelink resource allocation and configuration for FeD2D", R1-1713116, 3GPP TSG RAN WG1 Meeting #90, Aug. 25, 2017.

3rd Generation Partnership Project, "Technical Specification Group Services and System Aspects", Architecture Enhancements for V2X services (Release 15), TS 23.285 V15.1.0, Jun. 30, 2018.

* cited by examiner

METHOD AND DEVICE IN NODE FOR WIRELESS COMMUNICATION

CROSS-REFERENCE TO RELATED APPLICATION

This application is a continuation of International Application No. PCT/CN2019/098838, filed on Aug. 1, 2019, claiming the priority benefit of Chinese Application No. 201810894930.4, filed on Aug. 8, 2018, the full disclosure of which is incorporated herein by reference.

BACKGROUND

Technical Field

The disclosure relates to transmission methods and devices in wireless communication systems, and in particular to a communication method and device on sidelink in wireless communication.

Related Art

Application scenarios of future wireless communication systems are becoming increasingly diversified, and different application scenarios have different performance requirements on systems. In order to meet different performance requirements of various application scenarios, the $3^{rd}$ Generation Partner Project (3GPP) Radio Access Network (RAN) #72 plenary session decided to conduct the study of New Radio (NR). The work item of NR was approved at the 3GPP RAN #75 session to standardize the NR.

In view of Vehicle-to-Everything (V2X) services developing rapidly, 3GPP has also started the initiation of standards formulation and researches under NR framework. At present, 3GPP has accomplished the work of formulation of requirements orienting 5G V2X services and has written it into standards TS22.886. 3GPP defines four use case groups for 5G V2X services, including Vehicles Platnooning, Extended Sensors, Advanced Driving and Remote Driving. The Study Item (SI) of technical research of NR V2X was approved at the 3GPP RAN #80 session.

SUMMARY

In order to meet requirements of new services, compared with LTE V2X systems, NR V2X services have higher throughput, higher reliability, lower latency, further transmission distance, more accurate positioning, higher variability in packet size and transmission periodicity, and key technical features coexisting with current 3GPP technologies and non-3GPP technologies more efficiently. The work mode of the present LTE V2X systems is limited to broadcast transmission only. According to common knowledges reached at the 3GPP RAN #80 plenary session, NR V2X will study a technical scheme supporting multiple work modes of unicast, groupcast and broadcast.

In the work mode of the present LTE Device to Device (D2D)/V2X, a radio signal transmitted through sidelink by a User Equipment (UE) is broadcast, and the radio signal is not directed to a specific UE. When there is a big-packet service directed to a specific UE, the work mode of broadcast transmission is very low in resource utilization, and cannot guarantee reliable transmission either. Therefore, it is needed to take unicast transmission into account in D2D and V2X under NR so as to improve spectrum efficiency and transmission performance.

In view of the above problems, the disclosure provides a solution to support unicast transmission. It should be noted that the embodiments of the UE of the disclosure and the characteristics in the embodiments may be applied to the base station if no conflict is incurred, and vice versa. The embodiments of the disclosure and the characteristics in the embodiments may be mutually combined arbitrarily if no conflict is incurred. Further, although the disclosure is initially designed for unicast based transmission mechanisms, the disclosure is also applicable to broadcast and groupcast transmissions. Furthermore, although the disclosure is initially designed for single-carrier communications, the disclosure is also applicable to multi-carrier communications.

The disclosure provides a method in a first node for wireless communication, wherein the method includes:
transmitting a target radio signal; and
transmitting a first signaling and a first radio signal.
Herein, the target radio signal includes Q index group(s), the Q index group(s) comprises(comprise) Q first-type index(es) respectively, and each of the Q index group(s) includes at least one second-type index associated with a corresponding first-type index; the first signaling includes configuration information of the first radio signal, the first signaling includes one second-type index, a first-type index included in a first index group is used for generating the first radio signal, and the first index group is one of the Q index group(s) that includes a same second-type index as the first signaling; and the Q is a positive integer.

In one embodiment, the above method has the following benefits: the Q index group(s) correspond(s) to Q terminal(s) that are in sidelink communication with the first node respectively; a given index group is any one of the Q index group(s), the first-type index included in the given index group is a unique identifier of a corresponding terminal, and the second-type index included in the given index group is an identifier of the corresponding terminal at the first node side; through the above method, the first node can determine uniquely one terminal among the Q terminal(s), and can configure for the terminal a unique second-type index among Q terminal(s); after receiving the first signaling, a receiving terminal can know whether the first radio signal is a data channel transmitted to the receiving terminal; therefore, the complexity of reception of the data channel is simplified and the performance of reception is improved.

In one embodiment, the above method has another following benefit: the first-type index may follow the identifier in the present system, for example, a Cell-Radio Network Temporary Identifier (C-RNTI), while the second-type index is a short identifier, for example, a bit string of four bits; since there are not too many terminals communicating with the first node simultaneously, the second-type index with short length may reduce the overheads of data channels and improve spectrum efficiency.

In one embodiment, the above method has yet another following benefit: the target radio signal is transmitted in a broadcast or groupcast manner, and different second-type indexes are configured for different terminals when data is transmitted, to achieve an effect of unicast transmission of data.

According to one aspect of the disclosure, the above method includes:
receiving Q radio signal(s).
Herein, the Q radio signal(s) indicates(indicate) the Q first-type index(es) respectively.

In one embodiment, the above method has the following benefits: when the Q terminal(s) has(have) a terminal outside a serving cell of the first node or having a terminal outside a cellular network coverage, the mechanism in which the Q terminal(s) transmit(s) the Q first-type index(es) to the first node guarantees that the first node can generate the Q index group(s).

According to one aspect of the disclosure, the above method includes:

transmitting a second signaling.

Herein, the second signaling indicates a first index, and the first index is different from any one of the Q first-type index(es); and the first index is used for generating the first signaling.

In one embodiment, the above method has the following benefits: the first node transmits the first index through a physical layer signaling, so that a terminal in communication with the first node receives the first signaling through the first index, thereby improving the performance of reception of the first signaling.

According to one aspect of the disclosure, the above method includes:

detecting first information in each of K time window(s), the K being a positive integer.

Herein, the first information includes a Hybrid Automatic Repeat reQuest Acknowledgment (HARQ-ACK) associated to the first radio signal.

In one embodiment, the above method has the following benefits: the data channel on sidelink is fed back through the first information, that is, the HARQ-ACK of the first radio signal, thereby improving the performance of transmission and spectrum efficiency on sidelink.

According to one aspect of the disclosure, the above method is characterized in that: the second-type index included in the first signaling is used for determining a HARQ process number of the first radio signal.

In one embodiment, the above method has the following benefits: the second-type index included in the first signaling is one HARQ process allocated to the first radio signal; when data carried in the first radio signal is not correctly received, the second-type index may be used for the incremental redundancy based retransmission of the data conveniently, thereby improving the performance of data channel transmission and spectrum efficiency on sidelink.

In one embodiment, the above method has another following benefit: the first index group may further include other second-type indexes than the second-type index for the first radio signal, the other second-type indexes are all allocated to a second node, thus the second node may support multiple HARQ processes; therefore, flexibility and performance of transmission on sidelink are further improved.

The disclosure provides a method in a second node for wireless communication, wherein the method includes:

receiving a target radio signal; and receiving a first signaling; and, only when a first-type index included in a first index group is the same as a second index, receiving a first radio signal.

Herein, the target radio signal includes Q index group(s), the Q index group(s) comprises(comprise) Q first-type index(es) respectively, and each of the Q index group(s) includes at least one second-type index associated with a corresponding first-type index; the first signaling includes configuration information of the first radio signal, the first signaling includes one second-type index, the first-type index included in the first index group is used for generating the first radio signal, and the first index group is one of the Q index group(s) that includes a same second-type index as the first signaling; the Q is a positive integer; and the second index is an integer.

According to one aspect of the disclosure, the above method includes:

transmitting a second radio signal.

Herein, the second radio signal is one of Q radio signal(s), and the Q radio signal(s) indicates(indicate) the Q first-type index(es) respectively; and the second radio signal indicates the second index.

According to one aspect of the disclosure, the above method includes:

receiving a second signaling.

Herein, the second signaling indicates a first index, and the first index is different from any one of the Q first-type index(es); and the first index is used for generating the first signaling.

According to one aspect of the disclosure, the above method includes:

transmitting first information in one or more of K time window(s), the K being a positive integer.

Herein, the first information includes a HARQ-ACK associated to the first radio signal.

According to one aspect of the disclosure, the above method includes: the second-type index included in the first signaling is used for determining a HARQ process number of the first radio signal.

The disclosure provides a first node for wireless communication, wherein the first node includes:

a first transceiver, to transmit a target radio signal; and a second transceiver, to transmit a first signaling and a first radio signal.

Herein, the target radio signal includes Q index group(s), the Q index group(s) comprises(comprise) Q first-type index(es) respectively, and each of the Q index group(s) includes at least one second-type index associated with a corresponding first-type index; the first signaling includes configuration information of the first radio signal, the first signaling includes one second-type index, a first-type index included in a first index group is used for generating the first radio signal, and the first index group is one of the Q index group(s) that includes a same second-type index as the first signaling; and the Q is a positive integer.

The disclosure provides a second node for wireless communication, wherein the second node includes:

a third transceiver, to receive a target radio signal; and a fourth transceiver, to receive a first signaling, and, only when a first-type index included in a first index group is the same as a second index, to receive a first radio signal.

Herein, the target radio signal includes Q index group(s), the Q index group(s) comprises(comprise) Q first-type index(es) respectively, and each of the Q index group(s) includes at least one second-type index associated with a corresponding first-type index; the first signaling includes configuration information of the first radio signal, the first signaling includes one second-type index, the first-type index included in the first index group is used for generating the first radio signal, and the first index group is one of the Q index group(s) that includes a same second-type index as the first signaling; the Q is a positive integer; and the second index is an integer.

In one embodiment, compared with conventional schemes, the disclosure has the following advantages.

The Q index group(s) correspond to Q terminal(s) that are in sidelink communication with the first node respectively; a given index group is any one of the Q index group(s), the first-type index included in the given index group is a unique identifier of a corresponding terminal, and the second-type index included in the given index group is an identifier of the corresponding terminal at the first node side; through the above method, the first node can determine uniquely one terminal among the Q terminal(s), and can configure for the terminal a unique second-type index among Q terminal(s); after receiving the first signaling, a receiving terminal can know whether the first radio signal is a data channel transmitted to the receiving terminal; therefore, the complexity of reception of the data channel is simplified and the performance of reception is improved.

The first-type index may follow the present terminal identifier, for example, a C-RNTI or an S-TMSI, while the second-type index is a short identifier, for example, a bit string of four bits; since there are not too many terminals communicating with the first node simultaneously, the second-type index with short length may reduce the overheads of data channels and improve spectrum efficiency.

When the Q terminal(s) has(have) a terminal outside a serving cell of the first node or having a terminal outside a cellular network coverage, the mechanism in which the Q terminal(s) transmit(s) the Q first-type index(es) to the first node guarantees that the first node can generate the Q index group(s).

The data channel on sidelink is fed back through the first information, that is, the HARQ-ACK of the first radio signal, thereby improving the performance of transmission and spectrum efficiency on sidelink; the second-type index included in the first signaling is one HARQ process allocated to the first radio signal; when data carried in the first radio signal is not correctly received, the second-type index may be used for the incremental redundancy based retransmission of the data conveniently, thereby improving the performance of data channel transmission and spectrum efficiency on sidelink.

The first index group may further include other second-type indexes than the second-type index for the first radio signal, the other second-type indexes are all allocated to a second node, thus the second node may support multiple HARQ processes; therefore, flexibility and performance of transmission on sidelink are further improved.

BRIEF DESCRIPTION OF THE DRAWINGS

Other features, purposes and advantages of the disclosure will become more apparent from the detailed description of non-restrictive embodiments taken in conjunction with the following drawings.

DESCRIPTION OF THE EMBODIMENTS

The technical scheme of the disclosure is described below in further detail in conjunction with the drawings. It should be noted that the embodiments in the disclosure and the characteristics of the embodiments may be mutually combined arbitrarily if no conflict is incurred.

Embodiment 1

Figure 1:
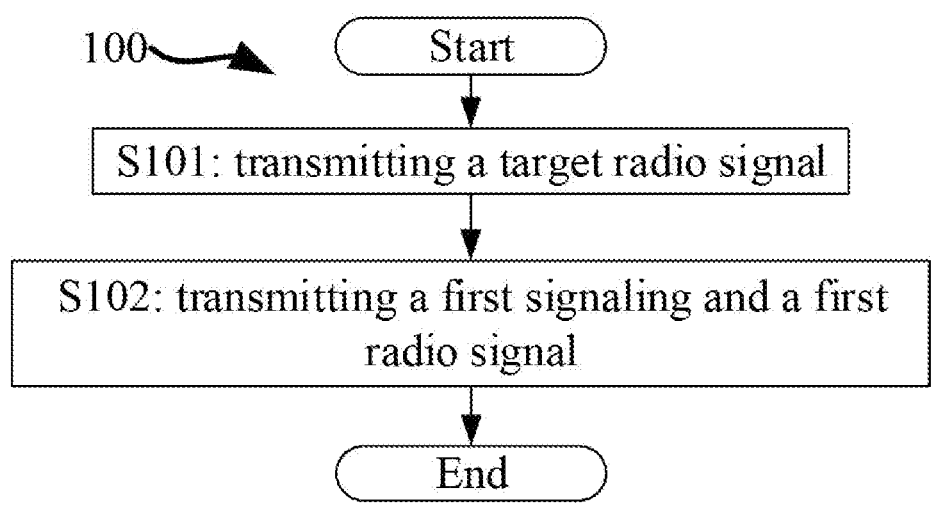
FIG. 1 is a flowchart of a target radio signal according to one embodiment of the disclosure.

Embodiment 1 illustrates an example of a flowchart of a target radio signal, as shown in FIG. 1. In 100 shown in FIG. 1, each box represents one step.

In embodiment 1, the first node in the disclosure transmits a target radio signal in S101, and transmits a first signaling and a first radio signal in S102; the target radio signal includes Q index group(s), the Q index group(s) comprises (comprise) Q first-type index(es) respectively, and each of the Q index group(s) includes at least one second-type index associated with a corresponding first-type index; the first signaling includes configuration information of the first radio signal, the first signaling includes one second-type index, a first-type index included in a first index group is used for generating the first radio signal, and the first index group is one of the Q index group(s) that includes a same second-type index as the first signaling; and the Q is a positive integer.

In one embodiment, each of the Q index group(s) includes only one second-type index associated with the corresponding first-type index.

In one embodiment, each of the Q index group(s) includes multiple second-type indexes associated with the corresponding first-type index.

In one embodiment, any two of the Q first-type indexes are different.

In one embodiment, at least two of the Q first-type indexes are the same.

In one subembodiment, the two same first-type indexes correspond to two index groups respectively, the two index groups include two second-type indexes associated with the two same first-type indexes respectively, and the two second-type indexes are different.

In one embodiment, only the second-type index included in the first index group among the Q index group(s) is the same as the second-type index included in the first signaling.

In one subembodiment, the first index group includes only one second-type index, and the second-type index included in the first signaling is the same as the only one second-type index included in the first index group.

In one subembodiment, the first index group includes multiple second-type indexes, and the second-type index included in the first signaling is the same as one of the multiple second-type indexes included in the first index group.

In one embodiment, any two first-type indexes included in the Q index groups include a same number of bits, and any two second-type indexes included in the Q index groups include a same number of bits.

In one subembodiment, the number of bits included in the first-type index included in any one of the Q index group(s) is greater than the number of bits included in the second-type index included in any one of the Q index group(s).

In one embodiment, the Q is 1.

In one embodiment, the Q is greater than 1.

In one embodiment, the Q is greater than 1, and the first radio signal is unrelated to any one of the Q first-type indexes other than the first-type index included in the first index group.

In one embodiment, the Q is greater than 1, any two of the Q index groups include different second-type indexes.

In one subembodiment, at least two of the Q index groups include a same first-type index.

In one embodiment, any one of the Q first-type index(es) is one C-RNTI.

In one embodiment, the Q first-type index(es) is(are) associated with Q different terminal(s) respectively.

In one subembodiment, Q1 first-type index(es) among the Q first-type index(es) is(are) configured by a serving base station of Q1 corresponding terminal(s), and Q2 first-type index(es) among the Q first-type index(es) is(are) autonomously generated by Q2 corresponding terminal(s), the Q1 and the Q2 are both non-negative integers not greater than Q, and the summation of the Q1 and the Q2 is equal to the Q.

In one affiliated embodiment of the above subembodiment, the Q1 is equal to the Q, or the Q2 is equal to the Q.

In one embodiment, any one of the Q first-type index(es) is one International Mobile Subscriber Identification Number (IMSI).

In one embodiment, any one of the Q first-type index(es) is a remainder of one IMSI modulo a given positive integer.

In one subembodiment, the given positive integer is equal to 1024.

In one embodiment, any one of the Q first-type index(es) is one SAE Temporary Mobile Subscriber Identity (S-TMSI).

In one embodiment, any one of the Q first-type index(es) is a remainder of one S-TMSI modulo a given positive integer.

In one subembodiment, the given positive integer is equal to 1024.

In one embodiment, any one of the Q first-type index(es) is one UE identifier.

In one embodiment, the Q index group(s) is(are) associated with Q different terminal(s) respectively.

In one subembodiment, the Q different terminal(s) can all be detected by the first node.

In one subembodiment, a Physical Sidelink Discovery Channel (PSDCH) transmitted by any one of the Q different terminal(s) can be detected by the first node.

In one subembodiment, at least one of a Primary Sidelink Synchronization Signal (PSSS) and a Secondary Sidelink Synchronization Signal (SSSS) transmitted by any one of the Q different terminal(s) can be detected by the first node.

In one embodiment, the first index group is associated with the second node in the disclosure, and the second node transmits the first information in the disclosure.

In one embodiment, a channel occupied by the target radio signal includes Physical Sidelink Shared Information (PSSCH).

In one subembodiment, the PSSCH occupied by the target radio signal is scheduled through given Sidelink Control Information (SCI), a Cyclic Redundancy Check (CRC) included in the given SCI is scrambled with a given sequence, and the given sequence is known to all receivers of the target radio signal.

In one subembodiment, the PSSCH occupied by the target radio signal is scheduled through a given SCI, a CRC included in the given SCI is scrambled with a given sequence, and the given sequence is predefined.

In one embodiment, a channel occupied by the target radio signal includes a Physical Sidelink Broadcasting Channel (PSBCH).

In one embodiment, a channel occupied by the target radio signal includes a PSDCH.

In one embodiment, the first signaling is one SCI.

In one embodiment, the first signaling is a physical layer signaling.

In one embodiment, the first signaling and the first radio signal are Frequency Division Multiplexing (FDM).

In one embodiment, the first signaling and the first radio signal are Time Division Multiplexing (TDM).

In one embodiment, a channel occupied by the first radio signal includes a PSSCH.

In one embodiment, the first signaling schedules the first radio signal.

In one embodiment, the configuration information of the first radio signal includes at least one of frequency-domain resources occupied by the first radio signal, a Modulation and Coding Status (MCS) employed by the first radio signal, a Redundancy Version (RV) employed by the first radio and a HARQ process number employed by the first radio signal.

In one embodiment, the phrase that the first-type index included in the first index group is used for generating the first radio signal includes: the first-type index included in the first index group is used for scrambling the first radio signal.

In one embodiment, the first node is one terminal.

In one embodiment, the first node is one UE.

In one embodiment, the first node is one vehicle.

Embodiment 2

Figure 2:
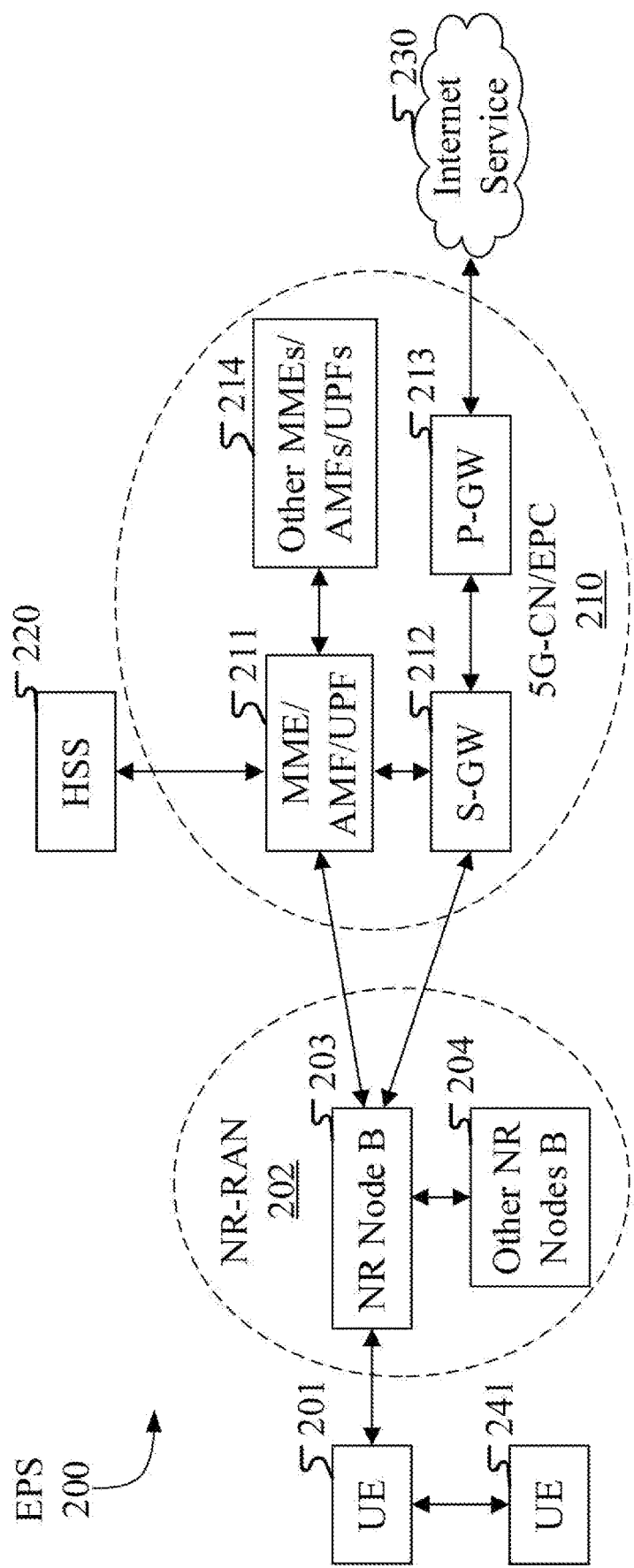
FIG. 2 is a diagram illustrating a network architecture according to one embodiment of the disclosure.

Embodiment 2 illustrates an example of a diagram of a network architecture, as shown in FIG. 2.

FIG. 2 is a diagram illustrating a network architecture 200 of 5G NR, Long-Term Evolution (LTE) and Long-Term Evolution Advanced (LTE-A) systems. The 5G NR or LTE network architecture 200 may be called an Evolved Packet System (EPS) 200 or some other appropriate terms. The EPS 200 may include one or more UEs 201, one UE 241 in sidelink communication with the UE 201, a Next Generation-Radio Access Network (NG-RAN) 202, an Evolved Packet Core/5G-Core Network (EPC/5G-CN) 210, a Home Subscriber Server (HSS) 220 and an Internet service 230. The EPS may be interconnected with other access networks. For simple description, the entities/interfaces are not shown. As shown in FIG. 2, the EPS provides packet switching services. Those skilled in the art are easy to understand that various concepts presented throughout the disclosure can be extended to networks providing circuit switching services or other cellular networks. The NG-RAN includes an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Basic Service Set (BSS), an Extended Service Set (ESS), a TRP or some other appropriate terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistants (PDAs), satellite radios, non-terrestrial base statin communications, satellite mobile communications, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art may also call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 includes a Mobility Management Entity/Authentication Management Field/User Plane Function (MME/AMF/UPF) 211, other MMEs/AMFs/UPFs 214, a Service Gateway (S-GW) 212 and a Packet Data Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including internet, intranet, IP Multimedia Subsystems (IP IMSs) and PS Streaming Services (PSSs).

In one embodiment, the UE 201 corresponds to the first node in the disclosure.

In one embodiment, the UE 241 corresponds to the second node in the disclosure.

In one embodiment, the first node in the disclosure is the UE 201, and the second node in the disclosure is one terminal in the coverage of the gNB 203.

In one embodiment, the first node in the disclosure is the UE 201, and the second node in the disclosure is one terminal outside the coverage of the gNB 203.

In one embodiment, the first node and the second node in the disclosure are both served by the gNB 203.

In one embodiment, the UE 201 supports transmission on multiple CCs simultaneously.

In one embodiment, the UE 201 supports transmission on multiple Bandwidth Parts (BWPs) simultaneously.

In one embodiment, the UE 241 supports transmission on multiple CCs simultaneously.

In one embodiment, the UE 241 supports transmission on multiple BWPs simultaneously.

In one embodiment, the gNB 203 supports transmission on multiple CCs simultaneously.

In one embodiment, the gNB 203 supports transmission on multiple BWPs simultaneously.

Embodiment 3

Figure 3:
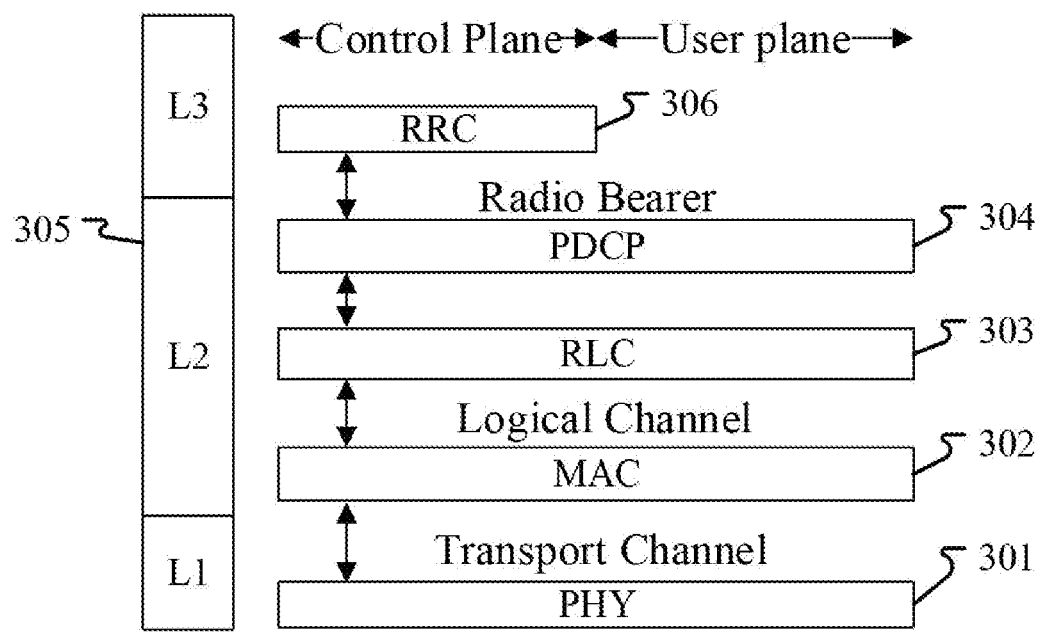
FIG. 3 is a diagram illustrating an embodiment of a radio protocol architecture of a user plane and a control plane according to one embodiment of the disclosure.

Embodiment 3 illustrates a diagram of an embodiment of a radio protocol architecture of a user plane and a control plane according to the disclosure, as shown in FIG. 3.

FIG. 3 is a diagram illustrating an embodiment of a radio protocol architecture of a user plane and a control plane. In FIG. 3, the radio protocol architecture of a UE and a base station (gNB or eNB) is illustrated by three layers, which are a Layer 1, a Layer 2 and a Layer 3 respectively. The Layer 1 (L1 layer) 301 is the lowest layer and implements various PHY (physical layer) signal processing functions. The L1 layer will be referred to herein as the PHY 301. The Layer 2 (L2 layer) 305 is above the PHY 301, and is responsible for the link between the UE and the gNB over the PHY 301. In the user plane, the L2 layer 305 includes a Medium Access Control (MAC) sublayer 302, a Radio Link Control (RLC) sublayer 303, and a Packet Data Convergence Protocol (PDCP) sublayer 304, which are terminated at the gNB on the network side. Although not shown in FIG. 3, the UE may include several higher layers above the L2 layer 305, including a network layer (i.e. IP layer) terminated at the P-GW on the network side and an application layer terminated at the other end (i.e. a peer UE, a server, etc.) of the connection. The PDCP sublayer 304 provides multiplexing between different radio bearers and logical channels. The PDCP sublayer 304 also provides header compression for higher-layer packets so as to reduce radio transmission overheads. The PDCP sublayer 304 provides security by encrypting packets and provides support for UE handover between gNBs. The RLC sublayer 303 provides segmentation and reassembling of higher-layer packets, retransmission of lost packets, and reordering of lost packets to as to compensate for out-of-order reception due to HARQ. The MAC sublayer 302 provides multiplexing between logical channels and transport channels. The MAC sublayer 302 is also responsible for allocating various radio resources (i.e., resource blocks) in one cell among UEs. The MAC sublayer 302 is also in charge of HARQ operations. In the control plane, the radio protocol architecture of the UE and the gNB is almost the same as the radio protocol architecture in the user plane on the PHY 301 and the L2 layer 305, with the exception that there is no header compression function for the control plane. The control plane also includes a Radio Resource Control (RRC) sublayer 306 in the layer 3 (L3). The RRC sublayer 306 is responsible for acquiring radio resources (i.e. radio bearers) and configuring lower layers using an RRC signaling between the gNB and the UE.

In one embodiment, the radio protocol architecture shown in FIG. 3 is applicable to the first node in the disclosure.

In one embodiment, the radio protocol architecture shown in FIG. 3 is applicable to the second node in the disclosure.

In one embodiment, the radio protocol architecture shown in FIG. 3 is applicable to the base station in the disclosure.

In one embodiment, the target radio signal in the disclosure is generated by the PHY 301.

In one embodiment, the first signaling in the disclosure is generated by the PHY 301.

In one embodiment, the first radio signal in the disclosure is generated by the MAC sublayer 302.

In one embodiment, any one of the Q radio signal(s) in the disclosure is generated by the PHY 301.

In one embodiment, the second signaling in the disclosure is generated by the PHY 301.

In one embodiment, the first information in the disclosure is generated by the PHY 301.

In one embodiment, the K time window(s) in the disclosure is(are) configured through the RRC sublayer 306.

Embodiment 4

Figure 4:
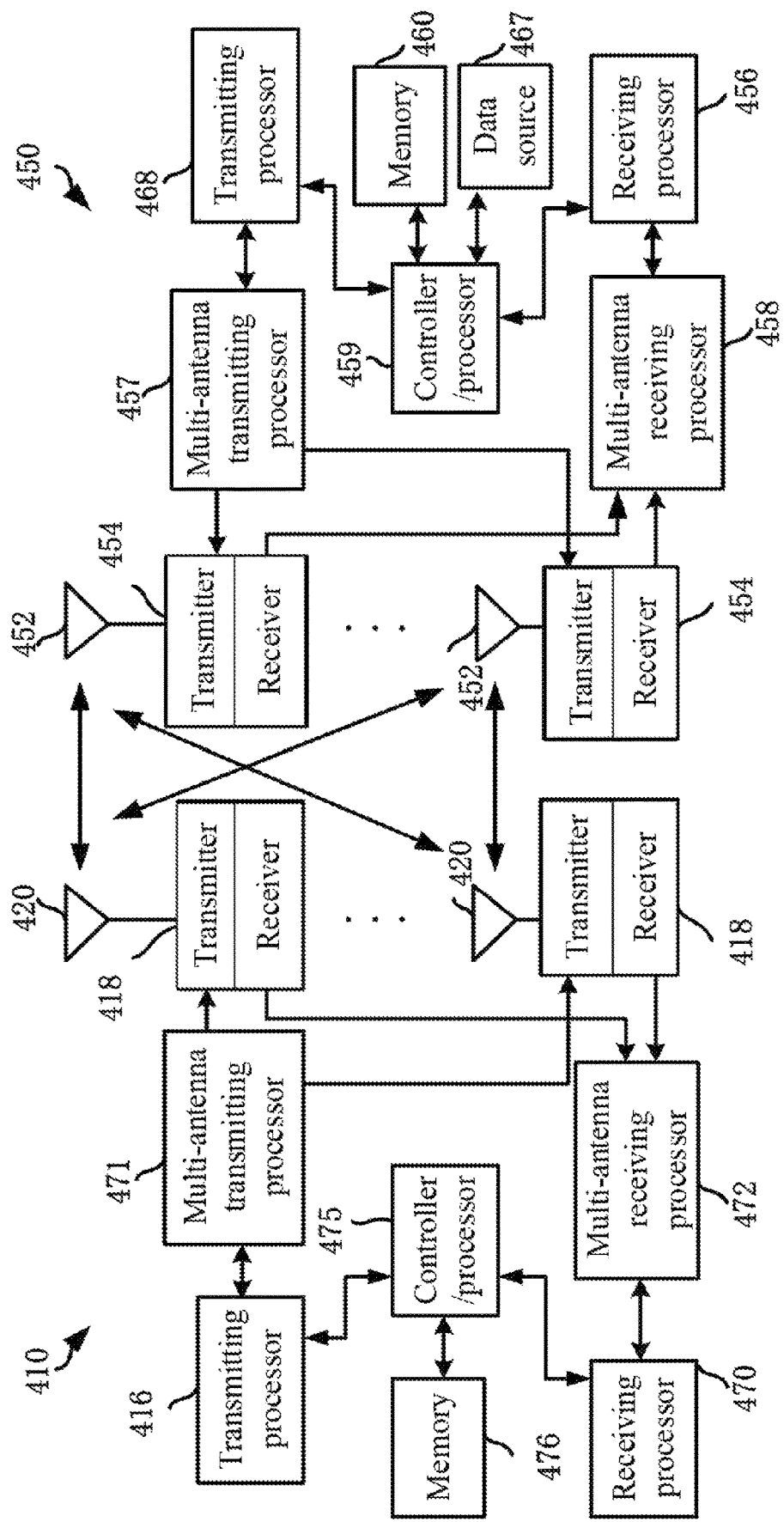
FIG. 4 is a diagram illustrating a first communication node and a second communication node according to one embodiment of the disclosure.

Embodiment 4 illustrates a diagram of a first communication equipment and a second communication equipment according to the disclosure, as shown in FIG. 4. FIG. 4 is a block diagram of a first communication equipment 450 and a second communication equipment 410 that are in communication with each other in an access network.

The first communication equipment 450 includes a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication equipment 410 includes a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication equipment 410 to the first communication equipment 450, at the second communication equipment 410, a higher-layer packet from a core network is provided to the controller/processor 475. The controller/processor 475 provides functions of Layer 2. In the transmission from the second communication equipment 410 to the first communication equipment 450, the controller/processor 475 provides header compression, encryption, packet segmentation and reordering, multiplexing between a logical channel and a transport channel, and a radio resource allocation for the first communication equipment 450 based on various priority metrics. The controller/processor 475 is also in charge of retransmission of lost packets, and signalings to the first communication equipment 450. The transmitting processor 416 and the multi-antenna transmitting processor 471 perform various signal processing functions used for Layer 1 (that is, PHY). The transmitting processor 416 performs encoding and interleaving so as to ensure FEC (Forward Error Correction) at the first communication equipment 450 and mappings to signal clusters corresponding to different modulation schemes (i.e., BPSK, QPSK, M-PSK M-QAM, etc.). The multi-antenna transmitting processor 471 processes the encoded and modulated symbols with digital spatial precoding (including precoding based on codebook and precoding based on non-codebook) and beamforming to generate one or more spatial streams. The transmitting processor 416 subsequently maps each spatial stream into a subcarrier to be multiplexed with a reference signal (i.e., pilot) in time domain and/or frequency domain, and then processes it with Inverse Fast Fourier Transform (IFFT) to generate a physical channel carrying time-domain multicarrier symbol streams. Then, the multi-antenna transmitting processor 471 processes the time-domain multicarrier symbol streams with transmitting analog precoding/beamforming. Each transmitter 418 converts a baseband multicarrier symbol stream provided by the multi-antenna transmitting processor 471 into a radio frequency stream and then provides it to different antennas 420.

In a transmission from the second communication equipment 410 to the first communication equipment 450, at the first communication equipment 450, each receiver 454 receives a signal via the corresponding antenna 452. Each receiver 454 recovers the information modulated to the RF carrier and converts the radio frequency stream into a baseband multicarrier symbol stream to provide to the receiving processor 456. The receiving processor 456 and the multi-antenna receiving processor 458 perform various signal processing functions of Layer 1. The multi-antenna receiving processor 458 processes the baseband multicarrier symbol stream coming from the receiver 454 with receiving analog precoding/beamforming. The receiving processor 458 converts the baseband multicarrier symbol stream subjected to the receiving analog precoding/beamforming operation from time domain into frequency domain using FFT (Fast Fourier Transform). In frequency domain, a physical layer data signal and a reference signal are demultiplexed by the receiving processor 456, wherein the reference signal is used for channel estimation, and the data signal is subjected to multi-antenna detection in the multi-antenna receiving processor 458 to recover any spatial stream targeting the UE 450. Symbols on each spatial stream are demodulated and recovered in the receiving processor 456 to generate a soft decision. Then, the receiving processor 456 decodes and de-interleaves the soft decision to recover the higher-layer data and control signal on the physical channel transmitted by the second communication equipment 410. Next, the higher-layer data and control signal are provided to the controller/processor 459. The controller/processor 459 performs functions of Layer 2. The controller/processor 459 may be connected to the memory 460 that stores program codes and data. The memory 460 may be called a computer readable media. In the transmission from the second communication equipment 410 to the first communication equipment 450, the controller/processor 459 provides multiplexing between the transport channel and the logical channel, packet reassembling, decryption, header decompression, and control signal processing so as to recover the higher-layer packet coming from the core network. The higher-layer packet is then provided to all protocol layers above Layer 2, or various control signals can be provided to Layer 3 for processing.

In a transmission from the first communication equipment 450 to the second communication equipment 410, at the first communication equipment 450, the data source 467 provides a higher-layer packet to the controller/processor 459. The data source 467 illustrates all protocol layers above the L2 layer. Similar as the transmitting function of the second communication equipment 410 described in the transmission from the second communication equipment 410 to the first communication equipment 450, the controller/processor 459 provides header compression, encryption, packet segmentation and reordering, and multiplexing between a logical channel and a transport channel based on radio resource allocation so as to provide the functions of L2 layer used for the control plane and user plane. The controller/processor 459 is also in charge of retransmission of lost packets, and signalings to the second communication equipment 410. The transmitting processor 468 conducts modulation mapping and channel encoding processing; the multi-antenna transmitting processor 457 performs digital multi-antenna spatial precoding (including precoding based on codebook and precoding based on non-codebook) and beaming processing; and subsequently, the transmitting processor 468 modulates the generated spatial streams into a multicarrier/single-carrier symbol stream, which is subjected to an analog precoding/beamforming operation in the multi-antenna transmitting processor 457 and then is provided to different antennas 452 via the transmitter 454. Each transmitter 452 first converts the baseband symbol stream provided by the multi-antenna transmitting processor 457 into a radio frequency symbol stream and then provides the radio frequency symbol stream to the antenna 452.

In a transmission from the first communication equipment 450 to the second communication equipment 410, the function of the second communication equipment 410 is similar as the receiving function of the first communication equipment 450 described in the transmission from second communication equipment 410 to the first communication equipment 450. Each receiver 418 receives a radio frequency signal via the corresponding antenna 420, converts the received radio frequency signal into a baseband signal, and provides the baseband signal to the multi-antenna receiving processor 472 and the receiving processor 470. The receiving processor 470 and the multi-antenna receiving processor 472 together provide functions of Layer 1. The controller/processor 475 provides functions of Layer 2. The controller/processor 475 may be connected to the memory 476 that stores program codes and data. The memory 476 may be called a computer readable media. In the transmission from the first communication equipment 450 to the second communication equipment 410, the controller/processor 475 provides de-multiplexing between the transport channel and the logical channel, packet reassembling, decryption, header decompression, and control signal processing so as to recover higher-layer packets coming from the UE 450. The higher-layer packet, coming from the controller/processor 475, may be provided to the core network.

In one embodiment, the first communication equipment 450 includes at least one processor and at least one memory. The at least one memory includes computer program codes. The at least one memory and the computer program codes are configured to be used in collaboration with the at least one processor. The first communication equipment 450 at least transmits a target radio signal, and transmits a first signaling and a first radio signal; the target radio signal includes Q index group(s), the Q index group(s) comprises (comprise) Q first-type index(es) respectively, and each of the Q index group(s) includes at least one second-type index associated with a corresponding first-type index; the first signaling includes configuration information of the first radio signal, the first signaling includes one second-type index, a first-type index included in a first index group is used for generating the first radio signal, and the first index group is one of the Q index group(s) that includes a same second-type index as the first signaling; and the Q is a positive integer.

In one embodiment, the first communication equipment 450 includes a memory that stores a computer readable instruction program. The computer readable instruction program generates an action when executed by at least one processor. The action includes: transmitting a target radio signal, and transmitting a first signaling and a first radio signal; the target radio signal includes Q index group(s), the Q index group(s) comprises(comprise) Q first-type index(es) respectively, and each of the Q index group(s) includes at least one second-type index associated with a corresponding first-type index; the first signaling includes configuration information of the first radio signal, the first signaling includes one second-type index, a first-type index included in a first index group is used for generating the first radio signal, and the first index group is one of the Q index group(s) that includes a same second-type index as the first signaling; and the Q is a positive integer.

In one embodiment, the second communication equipment 410 includes at least one processor and at least one memory. The at least one memory includes computer program codes. The at least one memory and the computer program codes are configured to be used in collaboration with the at least one processor. The second communication equipment 410 at least receives a target radio signal, receives a first signaling, and, only when a first-type index included in a first index group is the same as a second index, receives a first radio signal; the target radio signal includes Q index group(s), the Q index group(s) comprises(comprise) Q first-type index(es) respectively, and each of the Q index group(s) includes at least one second-type index associated with a corresponding first-type index; the first signaling includes configuration information of the first radio signal, the first signaling includes one second-type index, the first-type index included in the first index group is used for generating the first radio signal, and the first index group is one of the Q index group(s) that includes a same second-type index as the first signaling; the Q is a positive integer; and the second index is an integer.

In one embodiment, the second communication equipment 410 includes a memory that stores a computer readable instruction program. The computer readable instruction program generates an action when executed by at least one processor. The action includes: receiving a target radio signal, receiving a first signaling, and, only when a first-type index included in a first index group is the same as a second index, receiving a first radio signal; the target radio signal includes Q index group(s), the Q index group(s) comprises (comprise) Q first-type index(es) respectively, and each of the Q index group(s) includes at least one second-type index associated with a corresponding first-type index; the first signaling includes configuration information of the first radio signal, the first signaling includes one second-type index, the first-type index included in the first index group is used for generating the first radio signal, and the first index group is one of the Q index group(s) that includes a same second-type index as the first signaling; the Q is a positive integer; and the second index is an integer.

In one embodiment, the first communication equipment 450 corresponds to the first node in the disclosure.

In one embodiment, the second communication equipment 410 corresponds to the second node in the disclosure.

In one embodiment, at least one of the antenna 452, the transmitter 454, the multi-antenna transmitting processor 457 and the transmitting processor 468 is used for transmitting the target radio signal in the disclosure; and at least one of the antenna 420, the receiver 418, the multi-antenna receiving processor 472 and the receiving processor 470 is used for receiving the target radio signal in the disclosure.

In one embodiment, at least one of the antenna 452, the transmitter 454, the multi-antenna transmitting processor 457 and the transmitting processor 468 is used for transmitting the first signaling in the disclosure; and at least one of the antenna 420, the receiver 418, the multi-antenna receiving processor 472 and the receiving processor 470 is used for receiving the first signaling in the disclosure.

In one embodiment, at least one of the antenna 452, the transmitter 454, the multi-antenna transmitting processor 457 and the transmitting processor 468 is used for transmitting the first radio signal in the disclosure; and only when a first-type index included in a first index group is the same as a second index, at least one of the antenna 420, the receiver 418, the multi-antenna receiving processor 472 and the receiving processor 470 is used for receiving the first radio signal in the disclosure.

In one embodiment, at least one of the antenna 452, the receiver 454, the multi-antenna receiving processor 458 and the receiving processor 456 is used for receiving the Q radio signal(s) in the disclosure; at least one of the antenna 420, the transmitter 418, the multi-antenna transmitting processor 471 and the transmitting processor 416 is used for transmitting the second radio signal in the disclosure; the second radio signal is one of the Q radio signal(s), and the Q radio signal(s) indicates(indicate) the Q first-type index(es) in the disclosure respectively; and the second radio signal indicates the second index in the disclosure.

In one embodiment, at least one of the antenna 452, the transmitter 454, the multi-antenna transmitting processor 457 and the transmitting processor 468 is used for transmitting the second signaling in the disclosure; and at least one of the antenna 420, the receiver 418, the multi-antenna receiving processor 472 and the receiving processor 470 is used for receiving the second signaling in the disclosure.

In one embodiment, at least one of the antenna 452, the receiver 454, the multi-antenna receiving processor 458 and the receiving processor 456 is used for detecting the first information in the disclosure in each of K time window(s) in the disclosure; at least one of the antenna 420, the transmitter 418, the multi-antenna transmitting processor 471 and the transmitting processor 416 is used for transmitting the first information in the disclosure in one or more of the K time window(s) in the disclosure; and the K is a positive integer.

Embodiment 5

Figure 5:
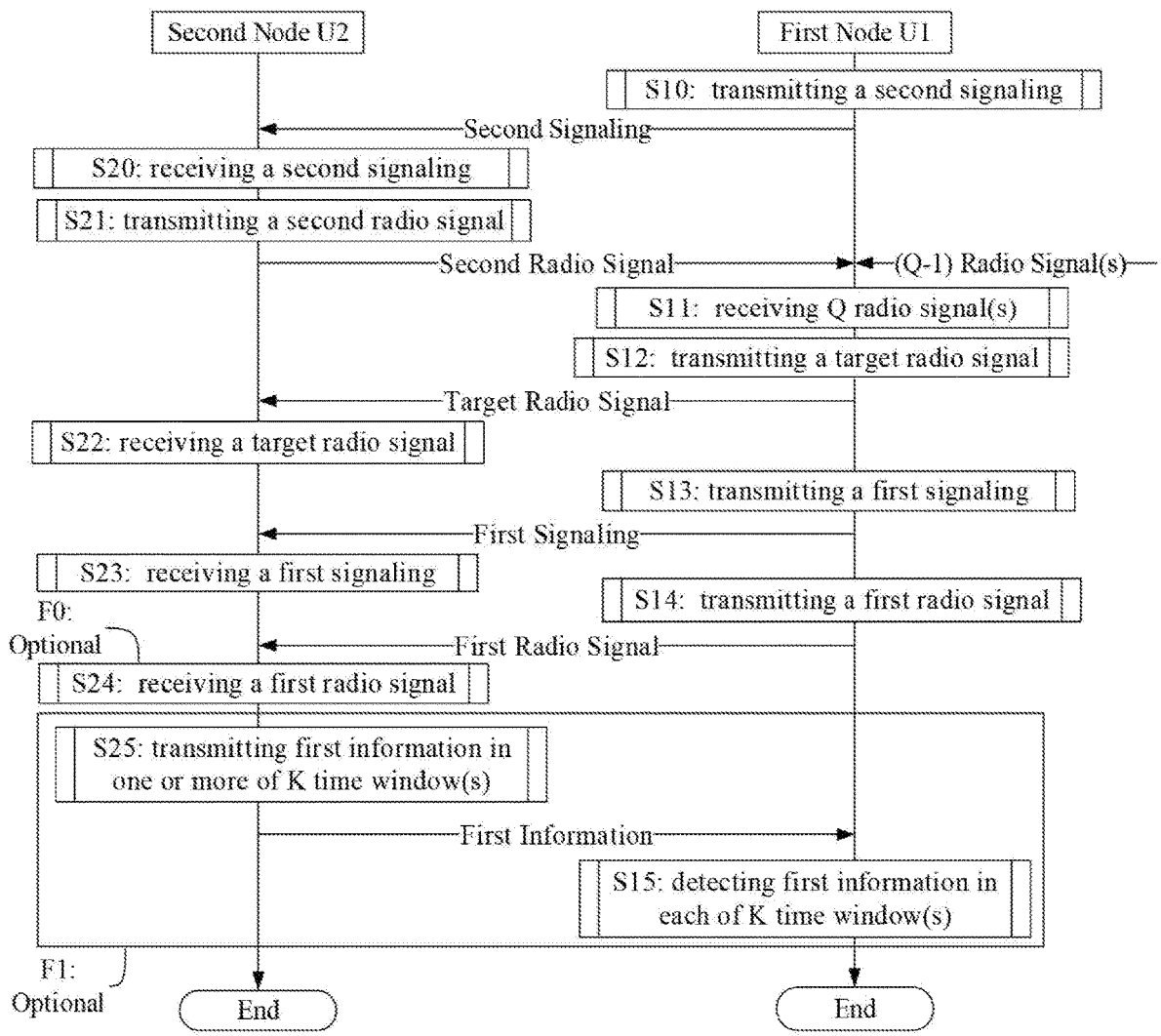
FIG. 5 is a flowchart of a first signaling according to one embodiment of the disclosure.

Embodiment 5 illustrates an example of a flowchart of a first signaling, as shown in FIG. 5. In FIG. 5, a first node U1 is in communication with a second node U2 through sidelink. In FIG. 5, steps in boxes F0 and F1 are optional. The (Q−1) radio signal(s) and the second radio signal shown in FIG. 5 constitute the Q radio signal(s) in the disclosure.

The first node U1 transmits a second signaling in S10, receives Q radio signal(s) in S11, transmits a target radio signal in S12, transmits a first signaling in S13, transmits a first radio signal in S14, and detects first information in each of K time window(s) in S15.

The second node U2 receives a second signaling in S20, transmits a second radio signal in S21, receives a target radio signal in S22, receives a first signaling in S23, receives a first radio signal in S24 only when a first-type index included in a first index group is the same as a second index, and transmits first information in one or more of K time window(s) in S25.

In Embodiment 5, the target radio signal includes Q index group(s), the Q index group(s) comprises(comprise) Q first-type index(es) respectively, and each of the Q index group(s) includes at least one second-type index associated with a corresponding first-type index; the first signaling includes configuration information of the first radio signal, the first signaling includes one second-type index, a first-type index included in a first index group is used for generating the first radio signal, and the first index group is one of the Q index group(s) that includes a same second-type index as the first signaling; the Q is a positive integer; the Q radio signal(s) indicates(indicate) the Q first-type index(es) respectively; the second radio signal is one of the Q radio signal(s), and the Q radio signal(s) indicates(indicate) the Q first-type index(es) respectively; and the second radio signal indicates the second index; the second signaling indicates a first index, and the first index is different from any one of the Q first-type index(es); the first index is used for generating the first signaling; the first information includes a HARQ-ACK associated to the first radio signal; the second-type index included in the first signaling is used for determining a HARQ process number of the first radio signal; the K is a positive integer; and the second index is an integer.

In one embodiment, a channel occupied by any one of the Q radio signal(s) includes a PSDCH.

In one embodiment, a channel occupied by any one of the Q radio signal(s) includes at least one of a PSSS and an SSSS.

In one embodiment, a channel occupied by any one of the Q radio signal(s) includes a PSBCH.

In one embodiment, Q terminal(s) transmit(s) the Q radio signal(s) respectively, and the Q terminal(s) is(are) associated to the Q index group(s) respectively.

In one subembodiment, the Q terminal(s) is(are) associated to the Q first-type index(es) indicated by the Q radio signal(s), respectively.

In one embodiment, the first index is autonomously generated by the first node U1.

In one embodiment, the first index is configured to the first node U1 by a base station of a cell serving the first node U1.

In one embodiment, the first index is one C-RNTI.

In one embodiment, the first index is one IMSI.

In one embodiment, the first index is a remainder of one IMSI modulo a given positive integer.

In one subembodiment, the given positive integer is 1024.

In one embodiment, the first index is one S-IMSI.

In one embodiment, the first index is a remainder of one S-IMSI modulo a given positive integer.

In one subembodiment, the given positive integer is 1024.

In one embodiment, the first index is used for generating the target radio signal.

In one embodiment, the first radio signal is unrelated to the first index.

In one embodiment, the first index includes a same number of bits as any one first-type index included in the Q index group(s).

In one embodiment, the phrase that the first index is used for generating the first signaling includes: a CRC included in the first signaling is scrambled with the first index.

In one embodiment, a channel occupied by the second signaling includes a PSBCH.

In one embodiment, a channel occupied by the second signaling includes a PSCCH.

In one embodiment, a channel occupied by the second signaling includes a PSDCH.

In one embodiment, a channel occupied by the second signaling includes a PSBCH and a PSCCH.

In one embodiment, a channel occupied by the second signaling includes a PSBCH and a PSDCH.

In one embodiment, channels occupied by the second signaling and the target radio signal both include a PSBCH.

In one embodiment, channels occupied by the second signaling and the target radio signal both include a PSCCH.

In one embodiment, channels occupied by the second signaling and the target radio signal both include a PSDCH.

In one embodiment, channels occupied by the second signaling and the target radio signal both include a PSBCH and a PSCCH.

In one embodiment, channels occupied by the second signaling and the target radio signal both include a PSBCH and a PSDCH.

In one embodiment, the first signaling is used for indicating the K time window(s).

In one embodiment, the first signaling is used for indicating first time-frequency resources, and the first information is transmitted in the first time-frequency resources.

In one subembodiment, the first time-frequency resources include K time-frequency sub-resource(s), and K time-domain resource(s) occupied by the K time-frequency sub-resource(s) belong(s) to the K time window(s) respectively.

In one subembodiment, the first time-frequency resources include K time-frequency sub-resource(s), and any one of K frequency-domain resource(s) occupied by the K time-frequency sub-resource(s) is indicated through the first signaling.

In one subembodiment, the first time-frequency resources include K time-frequency sub-resource(s), and any one of K frequency-domain resource(s) occupied by the K time-frequency sub-resource(s) is at a fixed position in frequency domain, or the position in frequency domain of any one of K frequency-domain resource(s) occupied by the K time-frequency sub-resource(s) is configured through a higher-layer signaling.

In one embodiment, the K time windows is(are) configured through a semi-static signaling.

In one embodiment, the K time windows is(are) configured through a higher-layer signaling.

In one embodiment, a time-domain position of each of the K time windows is related to a time-domain resource occupied by the first radio signal.

In one embodiment, the K is equal to 1.

In one embodiment, the K is greater than 1.

In one embodiment, the first node U1 judges whether the first information is transmitted by detecting a CRC.

In one embodiment, the first node U1 judges whether the first information is transmitted by detecting a demodulation reference signal.

In one embodiment, the first node U1 assumes that the first information can be transmitted in only one of the K time window(s) at most.

In one embodiment, the first node U1 assumes that the first information is transmitted in multiple time windows among the K time windows.

In one embodiment, the first-type index included in the first index group is used for generating the first information.

In one embodiment, a channel occupied by the first information includes a PSSCH.

In one embodiment, a channel occupied by the first information includes a PSCCH.

In one embodiment, the first information is transmitted in one of the K time window(s).

In one embodiment, the first information is transmitted in each of the K time window(s).

In one embodiment, the second-type index included in the first signaling occupies a number of bits not greater than 4.

In one embodiment, the first signaling is one SCI, the SCI includes a HARQ process number, and the HARQ process number is the second-type index included in the first signaling.

In one embodiment, the second node U2 is associated with M HARQ process numbers, and the second-type index included in the first signaling is one of the M HARQ process numbers.

In one subembodiment, the first index group includes M second-type indexes, and the M second-type indexes are one-to-one corresponding to the M HARQ process numbers.

In one embodiment, the second index is a first-type index among the Q first-type index(es) that is indicated by the second radio signal.

In one embodiment, the target radio signal is unrelated to the second index.

In one embodiment, the first signaling can be decoded by any terminal in a first terminal group, the second node U2 is one terminal in the first terminal group, and the second node U2 judges whether the first radio signal is a radio signal transmitted to the second node U2 by judging whether the first-type index in the first index group is the same as the second index.

In one subembodiment, the first-type index in the first index group is the same as the second index, the second node U2 receives the first radio signal.

In one subembodiment, the first-type index in the first index group is different from the second index, the second node U2 gives up receiving the first radio signal.

In one embodiment, the first index group includes M second-type indexes, the first signaling includes one second-type index only, and the second-type index included in the first signaling is one of the M second-type indexes; when the first-type index included in the first index group is the same as the second index, the second node U2 receives the first radio signal; and the M is a positive integer greater than 1.

In one embodiment, the first index group includes one second-type index only, the first signaling includes one second-type index only, and the second-type index included in the first signaling is the same as the second-type index included in the first index group; when the first-type index included in the first index group is the same as the second index, the second node U2 receives the first radio signal.

In one embodiment, the second index is autonomously generated by the second node U2.

In one embodiment, the second index is allocated to the second node U2 by a base station of a cell serving the second node U2.

In one embodiment, the second index is one C-RNTI.

In one embodiment, the second index is one IMSI.

In one embodiment, the second index is a remainder of one IMSI modulo a given positive integer.

In one subembodiment, the given positive integer is 1024.

In one embodiment, the second index is one S-IMSI.

In one embodiment, the second index is a remainder of one S-IMSI modulo a given positive integer.

In one embodiment, a channel occupied by the second radio signal includes a PSDCH.

In one embodiment, a channel occupied by the second radio signal includes at least one of a PSSS and an SSSS.

In one embodiment, a channel occupied by the second radio signal includes a PSBCH.

In one embodiment, the first index is different from the second index.

Embodiment 6

Figure 6:
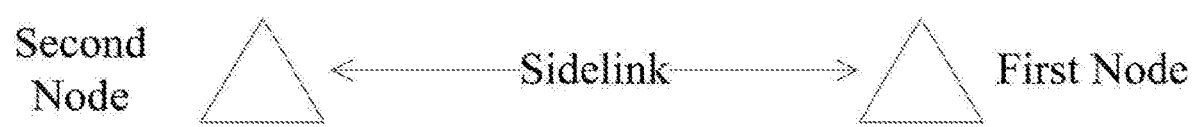
FIG. 6 is a diagram illustrating a first node and a second node according to one embodiment of the disclosure.

Embodiment 6 illustrates an example of a diagram of a first node and a second node, as shown in FIG. 6. In FIG. 6, the first node and the second node are both terminal equipment. The first node and the second node perform communications on a sidelink.

In one embodiment, the first node is a group head of transmitters of the Q radio signals in the disclosure, and the second node in the disclosure is one of the transmitters of the Q radio signals.

In one embodiment, the first node and the second node are served by one base station simultaneously.

In one embodiment, the first node and the second node are served by different base stations respectively.

In one embodiment, at least one of the first node and the second node is a vehicle.

In one embodiment, the first node and the second node are both vehicles.

In one embodiment, at least one of the first node and the second node is outside a cellular network coverage.

Embodiment 7

Figure 7:
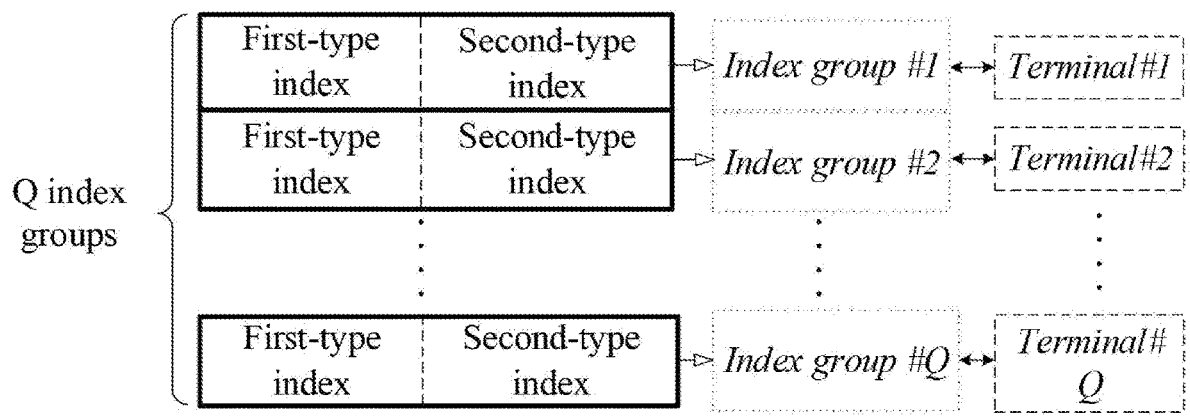
FIG. 7 is a diagram illustrating Q index groups according to one embodiment of the disclosure.

Embodiment 7 illustrates an example of a diagram of Q index groups, as shown in FIG. 7. In FIG. 7, the Q index groups in the disclosure are an index group #1 to an index group #Q, the Q index groups correspond to Q terminals respectively, and the Q terminals are a terminal #1 to a terminal #Q successively; and any one of the Q index groups includes one first-type index and one second-type index.

In one embodiment, the first-type index included in any one of the Q index groups occupies a fixed number of bits.

In one embodiment, the second-type index included in any one of the Q index groups occupies a fixed number of bits.

In one embodiment, any one of the Q index groups occupies a fixed number of bits.

In one embodiment, any two of the Q terminals are different terminals.

In one embodiment, any two of the Q first-type indexes included in the Q index groups are different.

In one embodiment, any two of the Q second-type indexes included in the Q index groups are different.

In one subembodiment, the number of bits occupied by any one of the Q second-type indexes is less than the number of bits occupied by any one of the Q first-type indexes.

In one embodiment, the total number of bits occupied by the Q index groups is constant.

Embodiment 8

Figure 8:
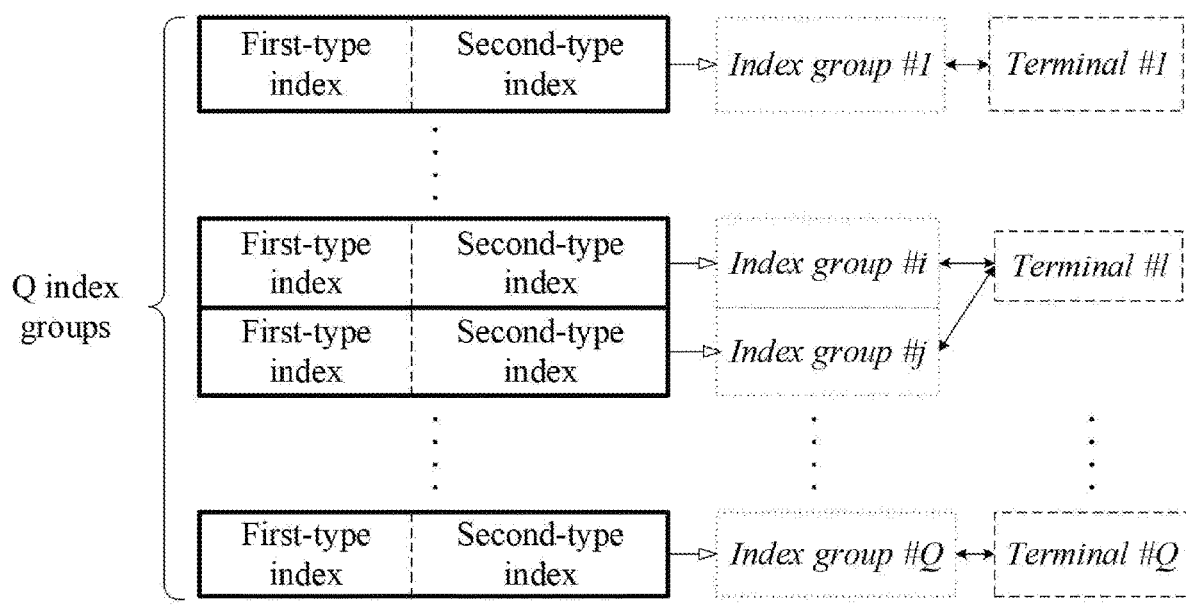
FIG. 8 is a diagram illustrating Q index groups according to another embodiment of the disclosure.

Embodiment 8 illustrates an example of another diagram of Q index groups, as shown in FIG. 8. In FIG. 8, the Q index groups in the disclosure correspond to an index group #1 to an index group #Q, the Q index groups correspond to Q1 terminals respectively, and the Q1 is a positive integer less than the Q; an index group #i and an index group #j among the Q index groups correspond to one same terminal #l; the i is not equal to the j, the i and the j are both positive integers not less than 1 but not greater than Q, and the l is a positive integer not less than 1 but not greater than Q; and any one of the Q index groups includes one first-type index and one second-type index only.

In one embodiment, the first-type index included in any one of the Q index groups occupies a fixed number of bits.

In one embodiment, the second-type index included in any one of the Q index groups occupies a fixed number of bits.

In one embodiment, any one of the Q index groups occupies a fixed number of bits.

In one embodiment, the Q1 terminals are different terminals.

In one embodiment, at least two of the Q first-type indexes included in the Q index groups are the same.

In one embodiment, at least two of the Q second-type indexes included in the Q index groups are different.

In one subembodiment, the number of bits occupied by any one of the Q second-type indexes is less than the number of bits occupied by any one of the Q first-type indexes.

In one embodiment, the first-type index included in the index group #i is the same as the first-type index included in the index group #j, and the second-type index included in the index group #i is different from the second-type index included in the index group #j.

In one embodiment, the total number of bits occupied by the Q index groups is constant.

Embodiment 9

Figure 9:
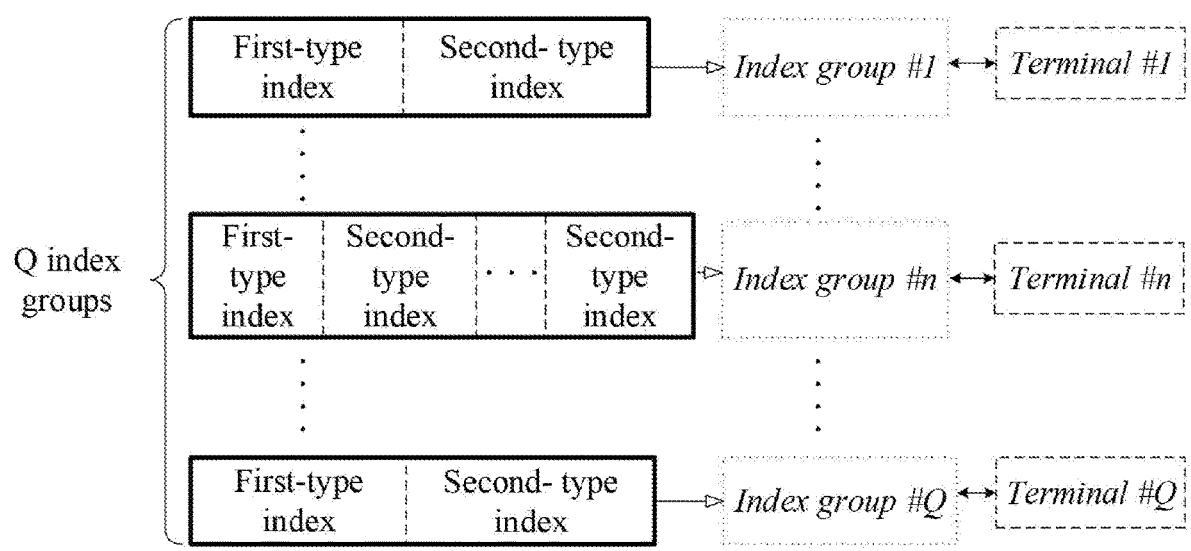
FIG. 9 is a diagram illustrating Q index groups according to yet another embodiment of the disclosure.

Embodiment 9 illustrates an example of yet another diagram of Q index groups, as shown in FIG. 9. In FIG. 9, the Q index groups in the disclosure correspond to an index group #1 to an index group #Q, and the Q index groups correspond to Q terminals respectively; the Q index groups include at least one index group #n, the index group #n corresponds to a terminal #n, the n is a positive integer not less than 1 but not greater than Q, the index group #n includes one first-type index and multiple second-type indexes, and the multiple second-type indexes are all related to the terminal #n.

In one embodiment, the first-type index included in any one of the Q index groups occupies a fixed number of bits.

In one embodiment, the second-type index included in any one of the Q index groups occupies a fixed number of bits.

In one embodiment, the Q index groups include at least two index groups, which include different numbers of second-type indexes.

In one embodiment, the Q index groups include at least two index groups, which occupy different numbers of bits.

In one embodiment, the Q1 terminals are different terminals.

In one embodiment, any two of the Q first-type indexes included in the Q index groups are different.

In one embodiment, the Q index groups include Q2 second-type indexes, the Q2 is a positive integer greater than the Q, and any two of the Q2 second-type indexes are different.

In one subembodiment, the number of bits occupied by any one of the Q2 second-type indexes is less than the number of bits occupied by any one of the Q first-type indexes.

In one embodiment, the number of bits occupied by the Q index groups is configurable.

Embodiment 10

Figure 10:
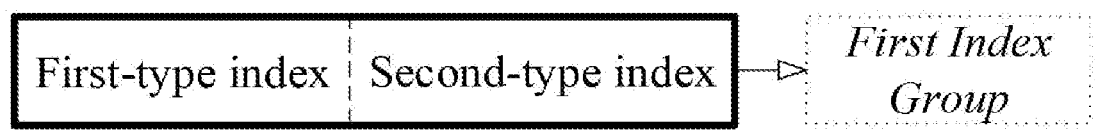
FIG. 10 is a diagram illustrating a first index group according to one embodiment of the disclosure.

Embodiment 10 illustrates an example of a diagram of a first index group, as shown in FIG. 10. In FIG. 10, the first index group includes one first-type index and one second-type index; the first-type index is one of Q first-type indexes indicated by the Q radio signals in the disclosure, and the second-type index included in the first signaling in the disclosure is equal to the second-type index included in the first index group.

Embodiment 11

Figure 11:
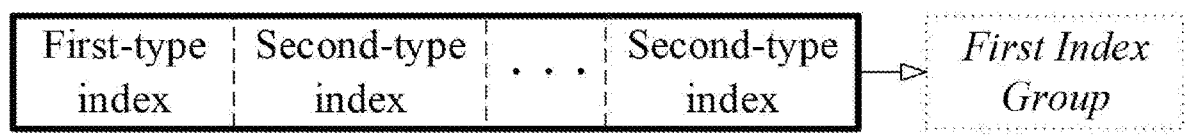
FIG. 11 is a diagram illustrating a first index group according to another embodiment of the disclosure.

Embodiment 11 illustrates an example of another diagram of a first index group, as shown in FIG. 11. In FIG. 11, the first index group includes one first-type index and multiple second-type indexes; the first-type index is one of Q first-type indexes indicated by the Q radio signals in the disclosure, and the second-type index included in the first signaling in the disclosure is one of the multiple second-type indexes included in the first index group.

Embodiment 12

Figure 12:
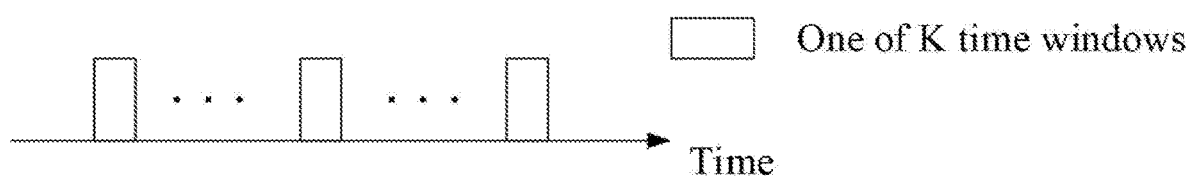
FIG. 12 is a diagram illustrating K time windows according to one embodiment of the disclosure.

Embodiment 12 illustrates an example of a diagram of K time windows, as shown in FIG. 12. In FIG. 12, the K time windows are discretely distributed in time domain.

In one embodiment, the K time windows are distributed in time domain at equal intervals.

In one embodiment, any one of the K time windows has a duration of 1 ms in time domain.

In one embodiment, a position of any one of the K time windows in time domain is configured through a higher-layer signaling, and the higher-layer signaling comes from a base station of a serving cell for the first node in the disclosure.

In one embodiment, a position of any one of the K time windows in time domain is indicated to the second node in the disclosure through the first signaling.

In one embodiment, a position of any one of the K time windows in time domain is predefined.

Embodiment 13

Figure 13:
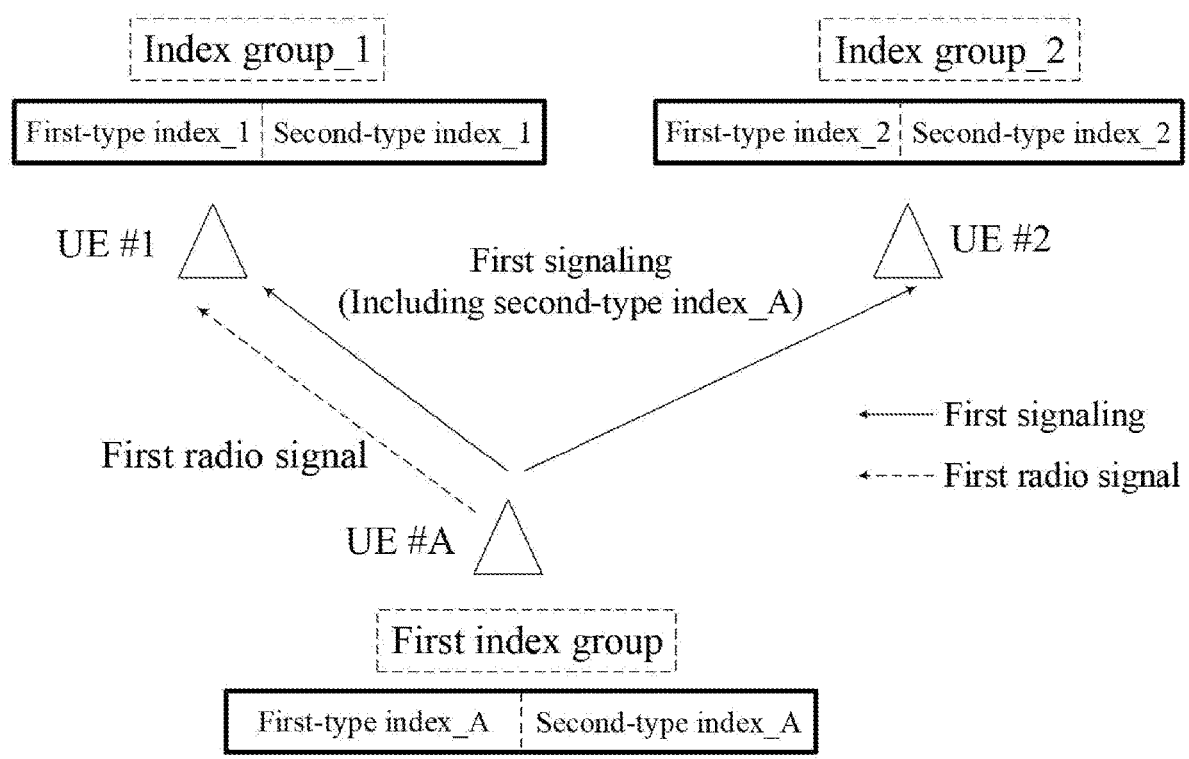
FIG. 13 is a diagram illustrating a relationship between a first index group and Q index groups according to one embodiment of the disclosure.

Embodiment 13 illustrates an example of a diagram of a first index group and Q index groups, as shown in FIG. 13. In FIG. 13, an index group #1 and an index group #2 are two different index groups among the Q index groups and correspond to a UE #1 and a UE #2 respectively; the index group #1 includes a first-type index_1 and a second-type index_1, and the second index group #2 includes a first-type index_2 and a second-type index_2; a UE #A shown in FIG. 13 transmits the first signaling and the first radio signal in the disclosure; the first radio signal is a data channel directed to the UE #1, and the first radio signal is not a data channel directed to the UE #2. A first index group shown in FIG. 13 includes a first-type index_A and a second-type index_A, and a UE corresponding to the first index group is an expected receiver of the first radio signal; and the first signaling shown in FIG. 13 includes the second-type index_A.

In one embodiment, for the UE #1, the first-type index_1 is equal to the first-type index_A, and the UE #1 determines that the first radio signal is a data directed to the UE #1 and receives the first radio signal.

In one embodiment, for the UE #2, the first-type index_2 is not equal to the first-type index_A, and the UE #2 determines that the first radio signal is not a data directed to the UE #2 and gives up receiving the first radio signal.

In one embodiment, the UE #1 and the UE #2 both receive the first signaling.

In one embodiment, the UE #1 and the UE #2 both determine the first index group from the Q index groups in the disclosure according to the second-type index_A indicated by the first signaling, and then determine, according to the first index group, the first-type index_A included in the first index group.

In one subembodiment, the UE #1 determines to receive the first radio signal by comparing the first-type index_A with the first-type index_1 associated with the UE #1.

In one subembodiment, the UE #2 determines to give up receiving the first radio signal by comparing the first-type index_A with the first-type index_2 associated with the UE #2.

Embodiment 14

Figure 14:
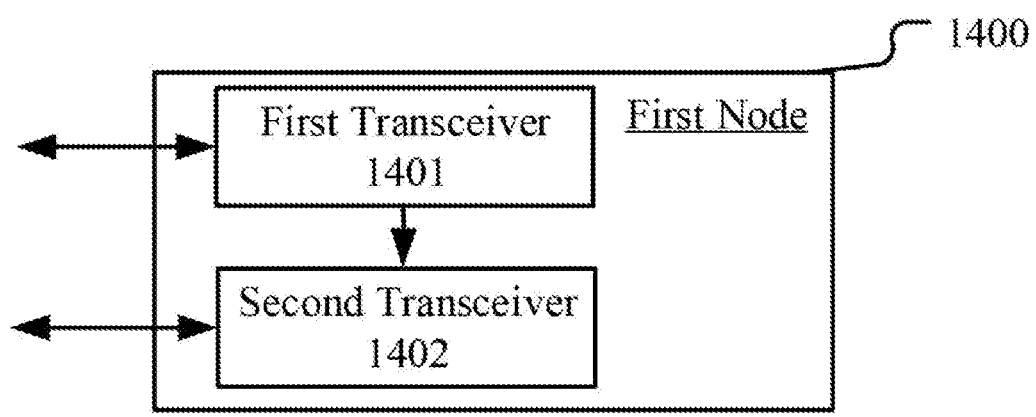
FIG. 14 is a structure block diagram illustrating a processing device in a first node according to one embodiment of the disclosure.

Embodiment 14 illustrates an example of a structure block diagram of a processing device in a first node, as shown in FIG. 14. In FIG. 14, the processing device 1400 in the first node includes a first transceiver 1401 and a second transceiver 1402.

The first transceiver 1401 is to transmit a target radio signal.

The second transceiver 1402 is to transmit a first signaling and a first radio signal.

In Embodiment 14, the target radio signal includes Q index group(s), the Q index group(s) comprises(comprise) Q first-type index(es) respectively, and each of the Q index group(s) includes at least one second-type index associated with a corresponding first-type index; the first signaling includes configuration information of the first radio signal, the first signaling includes one second-type index, a first-type index included in a first index group is used for generating the first radio signal, and the first index group is one of the Q index group(s) that includes a same second-type index as the first signaling; and the Q is a positive integer.

In one embodiment, the first transceiver 1401 further receives Q radio signal(s); and the Q radio signal(s) indicates(indicate) the Q first-type index(es) respectively.

In one embodiment, the first transceiver 1401 further transmits a second signaling; the second signaling indicates a first index, and the first index is different from any one of the Q first-type index(es); and the first index is used for generating the first signaling.

In one embodiment, the second transceiver 1402 detects first information in each of K time window(s), the K being a positive integer; and the first information includes a HARQ-ACK associated to the first radio signal.

In one embodiment, the second-type index included in the first signaling is used for determining a HARQ process number of the first radio signal.

In one embodiment, the first transceiver 1401 includes at least the former six of the antenna 452, the receiver/transmitter 454, the multi-antenna receiving processor 458, the multi-antenna transmitting processor 457, the receiving processor 456, the transmitting processor 458 and the controller/processor 459.

In one embodiment, the second transceiver 1402 includes at least the former six of the antenna 452, the receiver/transmitter 454, the multi-antenna receiving processor 458, the multi-antenna transmitting processor 457, the receiving processor 456, the transmitting processor 458 and the controller/processor 459.

Embodiment 15

Figure 15:
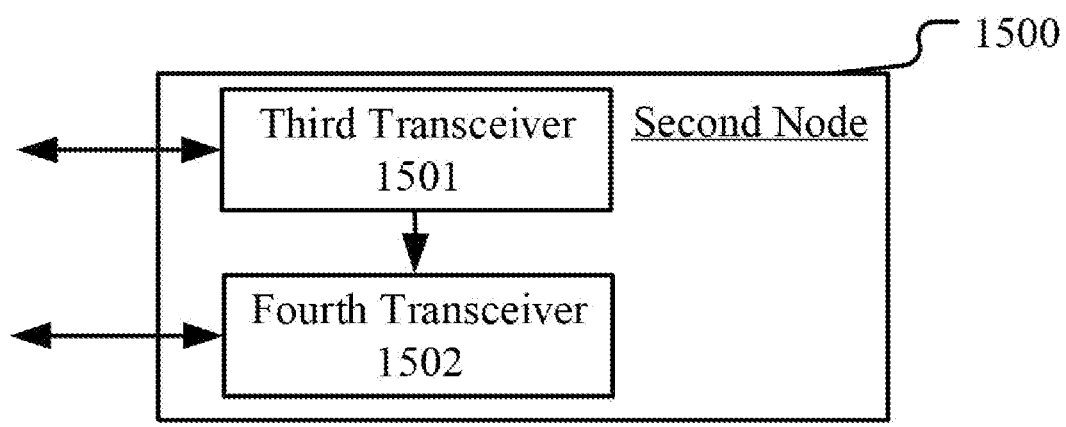
FIG. 15 is a structure block diagram illustrating a processing device in a second node according to one embodiment of the disclosure.

Embodiment 15 illustrates an example of a structure block diagram of a processing device in a second node, as shown in FIG. 15. In FIG. 15, the processing device 1500 in the second node includes a third transceiver 1501 and a fourth transceiver 1502.

The third transceiver 1501 is to receive a target radio signal.

The fourth transceiver 1502 is to receive a first signaling; only when a first-type index included in a first index group is the same as a second index, the fourth transceiver 1502 is further to receive a first radio signal.

In Embodiment 15, the target radio signal includes Q index group(s), the Q index group(s) comprises(comprise) Q first-type index(es) respectively, and each of the Q index group(s) includes at least one second-type index associated with a corresponding first-type index; the first signaling includes configuration information of the first radio signal, the first signaling includes one second-type index, the first-type index included in the first index group is used for generating the first radio signal, and the first index group is one of the Q index group(s) that includes a same second-type index as the first signaling; the Q is a positive integer; and the second index is an integer.

In one embodiment, the third transceiver 1501 further transmits a second radio signal; the second radio signal is one of Q radio signal(s), and the Q radio signal(s) indicates (indicate) the Q first-type index(es) respectively; and the second radio signal indicates the second index.

In one embodiment, the third transceiver 1501 further receives a second signaling; the second signaling indicates a first index, and the first index is different from any one of the Q first-type index(es); and the first index is used for generating the first signaling.

In one embodiment, the fourth transceiver 1502 further transmits first information in one or more of K time window(s), the K being a positive integer; and the first information includes a HARQ-ACK associated to the first radio signal.

In one embodiment, the second-type index included in the first signaling is used for determining a HARQ process number of the first radio signal.

In one embodiment, the third transceiver 1501 includes at least the former six of the antenna 420, the transmitter/receiver 418, the multi-antenna transmitting processor 471, the multi-antenna receiving processor 472, the transmitting processor 416, the receiving processor 470 and the controller/processor 475.

In one embodiment, the fourth transceiver 1502 includes at least the former six of the antenna 420, the transmitter/receiver 418, the multi-antenna transmitting processor 471, the multi-antenna receiving processor 472, the transmitting processor 416, the receiving processor 470 and the controller/processor 475.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The first node in the disclosure includes but not limited to mobile phones, tablet computers, notebooks, network cards, low-power equipment, enhanced MTC (eMTC) terminals, NB-IOT terminals, vehicle-mounted communication equipment, aircrafts, airplanes, unmanned aerial vehicles, telecontrolled aircrafts, and other radio communication equipment. The second node in the disclosure includes but not limited to mobile phones, tablet computers, notebooks, network cards, low-power equipment, eMTC terminals, NB-IOT terminals, vehicle-mounted communication equipment, aircrafts, airplanes, unmanned aerial vehicles, telecontrolled aircrafts, and other radio communication equipment. The UE or terminal in the disclosure includes but not limited to mobile phones, tablet computers, notebooks, network cards, low-power equipment, eMTC terminals, NB-IOT terminals, vehicle-mounted communication equipment, aircrafts, airplanes, unmanned aerial vehicles, telecontrolled aircrafts, and other radio communication equipment. The base station or network side equipment in the disclosure includes but not limited to macro-cellular base stations, micro-cellular base stations, home base stations, relay base stations, eNBs, gNBs, TRPs, GNSSs, relay satellites, satellite base stations, air base stations, and other radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A method in a first node for wireless communication, comprising:
    transmitting a target radio signal; and
    transmitting a first signaling and a first radio signal;
    wherein the target radio signal comprises Q index group(s), the Q index group(s) comprises(comprise) Q first-type index(es) respectively, and each of the Q index group(s) comprises at least one second-type index associated with a corresponding first-type index; the first signaling comprises configuration information of the first radio signal, the first signaling comprises one second-type index, a first-type index comprised in a first index group is used for generating the first radio signal, and the first index group is one of the Q index group(s) that comprises a same second-type index as the first signaling; and the Q is a positive integer.

2. The method according to claim 1, comprising:
    receiving Q radio signal(s);
    wherein the Q radio signal(s) indicates(indicate) the Q first-type index(es) respectively.

3. The method according to claim 1, comprising:
    transmitting a second signaling;
    wherein the second signaling indicates a first index, and the first index is different from any one of the Q first-type index(es); and the first index is used for generating the first signaling.

4. The method according to claim 1, comprising:
    detecting first information in each of K time window(s), the K being a positive integer;
    wherein the first information comprises a HARQ-ACK associated to the first radio signal.

5. The method according to claim 1, wherein the second-type index comprised in the first signaling is used for determining a HARQ process number of the first radio signal.

6. A method in a second node for wireless communication, comprising:
    receiving a target radio signal; and
    receiving a first signaling, and, only when a first-type index comprised in a first index group is the same as a second index, receiving a first radio signal;
    wherein the target radio signal comprises Q index group(s), the Q index group(s) comprises(comprise) Q first-type index(es) respectively, and each of the Q index group(s) comprises at least one second-type index associated with a corresponding first-type index; the first signaling comprises configuration information of the first radio signal, the first signaling comprises one second-type index, the first-type index comprised in the first index group is used for generating the first radio signal, and the first index group is one of the Q index group(s) that comprises a same second-type index as the first signaling; the Q is a positive integer; and the second index is an integer.

7. The method according to claim 6, comprising:
    transmitting a second radio signal;
    wherein the second radio signal is one of Q radio signal(s), and the Q radio signal(s) indicates(indicate) the Q first-type index(es) respectively; and the second radio signal indicates the second index.

8. The method according to claim 6, comprising:
receiving a second signaling;
wherein the second signaling indicates a first index, and the first index is different from any one of the Q first-type index(es); and the first index is used for generating the first signaling.

9. The method according to claim 6, comprising:
transmitting first information in one or more of K time window(s), the K being a positive integer;
wherein the first information comprises a HARQ-ACK associated to the first radio signal.

10. The method according to claim 6, wherein the second-type index comprised in the first signaling is used for determining a HARQ process number of the first radio signal.

11. A first node for wireless communication, comprising:
a first transceiver, to transmit a target radio signal; and
a second transceiver, to transmit a first signaling and a first radio signal;
wherein the target radio signal comprises Q index group(s), the Q index group(s) comprises(comprise) Q first-type index(es) respectively, and each of the Q index group(s) comprises at least one second-type index associated with a corresponding first-type index; the first signaling comprises configuration information of the first radio signal, the first signaling comprises one second-type index, a first-type index comprised in a first index group is used for generating the first radio signal, and the first index group is one of the Q index group(s) that comprises a same second-type index as the first signaling; and the Q is a positive integer.

12. The node according to claim 11, wherein the first transceiver receives Q radio signal(s); and the Q radio signal(s) indicates(indicate) the Q first-type index(es) respectively.

13. The node according to claim 11, wherein the first transceiver transmits a second signaling; the second signaling indicates a first index, and the first index is different from any one of the Q first-type index(es); and the first index is used for generating the first signaling.

14. The node according to claim 11, wherein the second transceiver detects first information in each of K time window(s), the K being a positive integer; and the first information comprises a HARQ-ACK associated to the first radio signal.

15. The node according to claim 11, wherein the second-type index comprised in the first signaling is used for determining a HARQ process number of the first radio signal.

16. A second node for wireless communication, comprising:
a third transceiver, to receive a target radio signal; and
a fourth transceiver, to receive a first signaling, and, only when a first-type index comprised in a first index group is the same as a second index, to receive a first radio signal;
wherein the target radio signal comprises Q index group(s), the Q index group(s) comprises(comprise) Q first-type index(es) respectively, and each of the Q index group(s) comprises at least one second-type index associated with a corresponding first-type index; the first signaling comprises configuration information of the first radio signal, the first signaling comprises one second-type index, the first-type index comprised in the first index group is used for generating the first radio signal, and the first index group is one of the Q index group(s) that comprises a same second-type index as the first signaling; the Q is a positive integer; and the second index is an integer.

17. The second node according to claim 16, wherein the third transceiver transmits a second radio signal; the second radio signal is one of Q radio signal(s), and the Q radio signal(s) indicates(indicate) the Q first-type index(es) respectively; and the second radio signal indicates the second index.

18. The second node according to claim 16, wherein the third transceiver receives a second signaling; the second signaling indicates a first index, and the first index is different from any one of the Q first-type index(es); and the first index is used for generating the first signaling.

19. The second node according to claim 16, wherein the fourth transceiver transmits first information in one or more of K time window(s), the K being a positive integer; and the first information comprises a HARQ-ACK associated to the first radio signal.

20. The second node according to claim 16, wherein the second-type index comprised in the first signaling is used for determining a HARQ process number of the first radio signal.

* * * * *